US011394723B2

(12) United States Patent
Fieau et al.

(10) Patent No.: US 11,394,723 B2
(45) Date of Patent: Jul. 19, 2022

(54) VALIDATION OF CONTENT DELIVERY AND VERIFICATION OF A DELEGATION OF DELIVERY OF A CONTENT

(71) Applicant: ORANGE, Issy-les-Moulineaux (FR)

(72) Inventors: Frederic Fieau, Chatillon (FR); Emile Stephan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 257 days.

(21) Appl. No.: 16/471,987

(22) PCT Filed: Dec. 14, 2017

(86) PCT No.: PCT/FR2017/053579
§ 371 (c)(1),
(2) Date: Jun. 20, 2019

(87) PCT Pub. No.: WO2018/115647
PCT Pub. Date: Jun. 28, 2018

(65) Prior Publication Data
US 2019/0334926 A1  Oct. 31, 2019

(30) Foreign Application Priority Data
Dec. 23, 2016 (FR) ...................... 1663343

(51) Int. Cl.
*H04L 29/06* (2006.01)
*H04L 9/40* (2022.01)
(52) U.S. Cl.
CPC ........ *H04L 63/126* (2013.01); *H04L 63/0823* (2013.01)
(58) Field of Classification Search
CPC ........................... H04L 63/126; H04L 63/0823
See application file for complete search history.

(56) References Cited

U.S. PATENT DOCUMENTS

| 7,058,685 | B1 * | 6/2006 | van Zee | G06Q 10/107 |
| | | | | 358/402 |
| 2004/0024688 | A1 * | 2/2004 | Bi | H04N 21/472 |
| | | | | 705/37 |

(Continued)

FOREIGN PATENT DOCUMENTS

| CN | 102035809 A | 4/2011 |
| WO | 2014124692 A1 | 8/2014 |

OTHER PUBLICATIONS

International Search Report dated Mar. 22, 2019 for corresponding International Application No. PCT/FR2017/053579, filed Dec. 14, 2017.

(Continued)

*Primary Examiner* — Vance M Little
(74) *Attorney, Agent, or Firm* — David D. Brush; Westman, Champlin & Koehler, P.A.

(57) ABSTRACT

Methods for validating delivery of content and verifying a delegation of delivery of a content, and corresponding devices and computer program products. A method is proposed for validating a delivery of a content to a client terminal. Such a method includes receiving, by the client terminal, an address, referred to as the received address, in response to a request sent to an address server in order to obtain an address of a delivery server of the content. The request includes a piece of information relating to the delivery server. Such a method further includes receiving, by the client terminal, a piece of information relating to an authentic address associated with the delivery server, the information being sent by a server of the content supplier, and determining the validity of the received address with respect to the authentic address on the basis of the information relating to the authentic address.

17 Claims, 3 Drawing Sheets

(56) References Cited

U.S. PATENT DOCUMENTS

| | | | |
|---|---|---|---|
| 2005/0149880 A1* | 7/2005 | Postrel | G06F 3/0482 |
| | | | 715/808 |
| 2007/0050625 A1* | 3/2007 | Mitchell | H04L 9/3263 |
| | | | 713/173 |
| 2007/0261112 A1 | 11/2007 | Todd et al. | |
| 2009/0007241 A1* | 1/2009 | Tewari | H04L 67/1014 |
| | | | 726/4 |
| 2010/0031041 A1 | 2/2010 | Cohen | |
| 2010/0121981 A1 | 5/2010 | Drako | |
| 2011/0145273 A1* | 6/2011 | Kolathaya | H04W 12/06 |
| | | | 707/769 |
| 2014/0115724 A1* | 4/2014 | van Brandenburg | G06F 21/10 |
| | | | 726/30 |

OTHER PUBLICATIONS

French Search Report dated Aug. 10, 2017 for corresponding French Application No. 2017/053579, filed Jun. 26, 2019.
English translation of the Written Opinion of the International Searching Authority dated Jun. 25, 2019 for corresponding International Application No. 2017/053579, filed Jun. 26, 2019.
English machine translation of European Notification under Article 94(3) EPC dated Dec. 23, 2021 for related European Application No. 17 822 425.9.

* cited by examiner

VALIDATION OF CONTENT DELIVERY AND VERIFICATION OF A DELEGATION OF DELIVERY OF A CONTENT

CROSS-REFERENCE TO RELATED APPLICATIONS

This Application is a Section 371 National Stage Application of International Application No. PCT/FR2017/053579, filed Dec. 14, 2017, which is incorporated by reference in its entirety and published as WO 2018/115647 A1 on Jun. 28, 2018, not in English.

1 TECHNICAL FIELD

The present invention relates to the field of verifying delegation of delivery of an item of content from a server of a content provider to a delivery server that will effectively perform the delivery of the item of content to a client terminal.

More precisely, the present invention relates to a technique for securing such delegation.

The invention has numerous applications, in particular, but not exclusively, in the field of multimedia content broadcasting (for example of the type containing one or more audio and/or video streams, an executable file, a webpage, etc.) in which a fraudulent substitution of delivered content may be particularly problematic.

2 TECHNOLOGICAL BACKGROUND

When a user wishes to obtain an item of content from a content provider via a client terminal of the user, the client terminal sends a request to a server of the content provider so as to obtain the item of content in question.

Conventionally, the delivery of the item of content is delegated by the server of the content provider to a delivery server. Thus, in response to the request from the client terminal, the server of the content provider sends the client terminal a response message containing the domain name of the delivery server from which the client terminal is able to obtain the item of content.

In this way, the client terminal is able to obtain the network address (for example an IP address in accordance with the Internet protocol) of the delivery server in question from a domain name resolution server (DNS for domain name server) on the basis of the domain name provided by the server of the content provider. It is notable that, in some applications, the domain name resolution server in question is a domain name resolution server local to the network access provider. This local server then obtains global information on the correspondence between the existing domain names and the network addresses (for example in accordance with the Internet protocol) from an authoritative domain name resolution server.

However, in some situations, the delivery of the item of content is performed in a multiple delegation context.

For example, in a dual delegation context, the network address provided by the domain name resolution server (which is possibly local, as discussed above) is not that of what is known as a primary delivery server (i.e. the server that would effectively perform the delivery in the case of single delegation from the server of the content provider to this delivery server), but that of a secondary delivery server on which the item of content is available. In this case, the delivery is also delegated by the primary delivery server to the secondary delivery server in question.

In other configurations, the second delegation may be followed by a third delegation to a tertiary delivery server on which the item of content is available, and which will effectively perform the delivery to the client terminal, and so on. In this way, configurations with multiple delegations may be contemplated.

The shared feature of all of these delivery delegation modes is the requirement to pass via a domain name resolution server in order to obtain the address of the delivery server that will effectively perform the delivery of the item of content to the client terminal. Now, such a server may in fact prove to exhibit low security. Moreover, the DNS protocol itself is insecure by nature. Thus, the cache of such a domain name resolution server may have been corrupted (for example via a cache poisoning attack). For example, in a dual delegation context, the address of a fraudulent secondary delivery server could have been substituted for the address of the authentic secondary delivery server to which the primary delivery server wished to delegate the delivery of the item of content.

When the returned address of the secondary delivery server corresponds to that of a fraudulent delivery server, the user will potentially access an undesired item of content delivered by the fraudulent delivery server. This fraudulent item of content will then not correspond to his initial request. This may be particularly harmful for the user, for example when the requested items of content are intended for children, or when the item of content effectively received contains spyware (intended for example to infect the client terminal or to capture private information).

The same problem arises when the client terminal obtains an item of content from the primary delivery server, that is to say when the primary delivery server has not delegated the delivery of the item of content to a secondary delivery server.

There is therefore a need to improve the prior art.

3 SUMMARY

In one embodiment of the described technique, what is proposed is a method for validating delivery of an item of content to a client terminal. Such a method comprises a step of reception, by the client terminal, of an address, called received address, in response to a request sent to an address server in order to obtain an address of a delivery server for delivering the item of content, the request comprising an item of information to the delivery server. Such a method furthermore comprises at least the following steps implemented by the client terminal:

reception of an item of information to an authentic address associated with the delivery server, the item of information being sent by a server (CSP) of the content provider; and determination of the validity of the received address with respect to the authentic address on the basis of the item of information to the authentic address.

The described technique thus proposes a novel and inventive solution for allowing the client terminal to validate the delivery of an item of content, in particular when the delivery of the item of content is delegated from a server of a content provider to a delivery server that will effectively perform the delivery of the item of content to the client terminal.

To this end, the described technique makes provision for the address of the delivery server received by the client terminal to be validated (i.e. the address of the server actually performing the delivery of the item of content, and which is potentially a fraudulent server, to the client terminal) on the basis of an item of information that it receives from the server of the content provider.

The client terminal thus knows whether the delivery server from which it received the address has effectively received a content delivery delegation from the server of the content provider (and therefore whether it is indeed the delivery server corresponding to the authentic address), or whether it is a fraudulent server. The client terminal is thus able to react accordingly, for example by interrupting the reception of the item of content or by not continuing to establish a connection to this fraudulent server.

The address server is for example a domain name resolution server. Such a domain name resolution server makes it possible to obtain, from a request comprising an item of information to the delivery server, the IP address associated, in the domain name resolution server, with the item of information to the delivery server. Such an item of information to the delivery server may correspond to a domain name associated with the delivery server, to a URL (for "uniform resource locator"), to an IP address, or to any combination of these items of information. The request transmitted by the client terminal to the name resolution server may correspond to any type of request able to be interpreted by such a server for obtaining, on the basis of an item of information contained in the request, an address for accessing the effective content delivery server.

According to one embodiment of the validation method, the item of information comprises the authentic address, and the determination of the validity of the received address with respect to the authentic address furthermore comprises comparing the received address and the authentic address.

The client terminal thus has knowledge of the authentic address, thereby allowing it to verify the authenticity of the secondary delivery server intended for the effective delivery of the item of content.

According to one embodiment of the validation method, the determination of the validity of the received address with respect to the authentic address furthermore comprises, prior to the reception of the item of information, sending a request to the server of the content provider, comprising the received address identifying the delivery server so as to receive the item of information, the item of information corresponding to at least one data field positioned at a value indicating whether the received address is equal to the authentic address.

Thus, the verification of the match between the received address and the authentic address is performed by the server of the content provider, thereby simplifying the processing operations performed by the client terminal.

According to one embodiment of the validation method, the validation method furthermore comprises receiving a message comprising at least one item of data for implementing the determination of the validity of the received address with respect to the authentic address, in response to a request from the client terminal to the content provider server in order to obtain the item of content.

The content provider thus keeps control over the implementation of the validation of the delivery delegation by the client terminal.

Moreover, the content provider may also indicate in this way to the client terminal whether, in order to implement the following steps linked to the determination of the validity of the received address with respect to the authentic address, said client terminal will have to send the corresponding requests to the server of the content provider that responded to the present request from the client terminal in order to obtain the item of content, or else to another server of the content provider.

According to one embodiment of the validation method, the at least one item of data comprises at least code instructions for implementing the determination of the validity of the received address with respect to the authentic address.

Known client terminals (for example equipped with a known Internet browser) may thus implement the described technique, the additional means necessary for this implementation being provided to them by the server of the content provider.

According to one embodiment of the validation method, the at least one item of data comprises at least one other data field positioned at a value telling the client terminal to perform the determination of the validity of the received address with respect to the authentic address.

The traffic between the client terminal and the server of the content provider is thus minimized, as the additional means necessary to implement the described technique are already present in the client terminal.

According to one embodiment of the validation method, the validation method furthermore comprises downloading the item of content delivered by a delivery server identified by the received address, the delivery being performed via a secure TLS (for "Transport Layer Security") connection based on a certificate of the domain name, the determination of the validity of the received address with respect to the authentic address being implemented when the certificate is self-signed by the delivery server identified by the received address.

Thus, the verification by the client terminal is performed only when there is suspicion as to the nature of the secondary delivery server.

In another embodiment of the described technique, what is proposed is a method for verifying delegation of delivery of an item of content to a client terminal. Such a method comprises the following steps, implemented by a server of the content provider:

obtaining an item of information allowing the client terminal to determine the validity of an address received by the client terminal with respect to an authentic address associated with a delivery server, the address received by the client terminal being received in response to a request sent by the client terminal to an address server in order to obtain a delivery address for delivering the item of content, the request comprising an item of information to the delivery server; and sending the item of information to the client terminal.

The described technique thus proposes a novel and inventive solution for allowing the server of the content provider to verify the delegation of delivery of an item of content to a delivery server that will effectively perform the delivery of the item of content to the client terminal.

To this end, the described technique makes provision for the server of the content provider to obtain the authentic address of the delivery server to which it has delegated the delivery of the item of content.

On the basis of this item of information, the verification of the address of the delivery server received by the client terminal (i.e. the server actually performing the delivery of the item of content, and which is potentially a fraudulent server, to the client terminal) may be performed so as to allow the user terminal to validate the delegation of delivery of the item of content and react accordingly.

According to one embodiment of the verification method, the item of information sent to the client terminal corresponds to the authentic address.

The user terminal thus has knowledge of the authentic address, thereby allowing it to verify the authenticity of the secondary delivery server intended for the effective delivery of the item of content.

According to one embodiment, the verification method furthermore comprises:
- receiving at least one request sent by the client terminal, the at least one request comprising the received address; and
- comparing the received address and the authentic address in order to deliver the item of information sent to the client terminal, the item of information sent to the client terminal corresponding to at least one data field positioned at a value indicating whether the received address is equal to the authentic address.

Thus, the verification of the match between the received address and the authentic address is performed by the server of the content provider, thereby simplifying the processing operations by the client terminal.

According to one embodiment of the validation and verification methods, the delivery is delegated by the delivery server to at least one secondary delivery server, the authentic address identifying the secondary delivery server being stored in the delivery server.

The described technique thus applies to the case of multiple delegations, the delivery server (uCDN) in this case becoming a primary delivery server delegating the delivery of the item of content to at least one secondary delivery server (dCDNa).

According to one embodiment of the validation and verification methods, the authentic address belongs to the group comprising:
- a predetermined address stored on the delivery server;
- a predetermined address stored on the server of the content provider;
- an address obtained by the server of the content provider from the delivery server for the item of content; and
- an address obtained beforehand by the server of the content provider from the delivery server for the item of content and updated periodically from the delivery server.

The authentic address may thus either be predetermined, allowing optimum security and minimization of the exchanges between entities, or obtained from the delivery server (uCDN), so as to allow the implementation of the described technique when the authentic address changes over time.

In another embodiment of the invention, what is proposed is a computer program comprising program code instructions for implementing a method such as described above, in any one of its various embodiments, when said program is executed on a computer.

In another embodiment of the invention, what is proposed is a non-transient computer-readable storage medium, storing a computer program comprising program code instructions for implementing a method such as described above, according to any one of its various embodiments.

In another embodiment of the invention, what is proposed is a device for validating delivery of an item of content to a client terminal. Such a device comprises a reprogrammable computing machine or a dedicated computing machine able and configured so as to receive an address, called received address, in response to a request sent to an address server in order to obtain an address of a delivery server for delivering said item of content, the request comprising an item of information to the delivery server. The reprogrammable computing machine or the dedicated computing machine is furthermore able and configured so as to:
- receive an item of information to an authentic address associated with the delivery server, the item of information being sent by a server of the content provider; and
- determine the validity of the received address with respect to the authentic address on the basis of the item of information to the authentic address.

What is thus also proposed is a validation device able to implement the validation method in accordance with the described technique (according to any one of the various abovementioned embodiments). The features and advantages of this device are thus the same as those of the validation method described above. They are therefore not described in more detail.

In another embodiment of the invention, what is proposed is a terminal comprising a validation device as described above, according to any one of its various embodiments.

In another embodiment of the invention, what is proposed is a device for verifying delegation of delivery of an item of content. Such a device comprises a reprogrammable computing machine or a dedicated computing machine, able and configured so as to:
- obtain an item of information allowing the client terminal to determine the validity of an address received by the client terminal with respect to an authentic address associated with a delivery server, the address received by the client terminal being received in response to a request sent by the client terminal to an address server in order to obtain an address of the delivery server, the request comprising an item of information to the delivery server; and
- send the item of information to the client terminal.

What is thus also proposed is a verification device able to implement the verification method in accordance with the described technique (according to any one of the various abovementioned embodiments). The features and advantages of this device are thus the same as those of the verification method described above. They are therefore not described in more detail.

In another embodiment of the invention, what is proposed is a server comprising a verification device as described above, according to any one of its various embodiments.

LIST OF THE FIGURES

Other features and advantages will become more clearly apparent upon reading the following description of particular embodiments of the disclosure, provided by way of simple illustrative and nonlimiting example, and the appended drawings, in which.

5 DETAILED DESCRIPTION

Identical elements and steps are denoted by one and the same reference throughout the figures of the present document.

The general principle of the described technique consists in proposing a method for validating delivery of an item of content referenced on a server of a content provider to a client terminal in a delivery delegation context.

More particularly, the general principle described hereinafter applies both in a single delegation context (in this case, the address to be verified is that of a delivery server known to the server of the content provider by way of a domain name) and in a multiple delegation context (in this case, the delivery server known to the server of the content provider delegates the delivery to at least one secondary delivery server).

A description is given hereinafter more particularly of the principle of the invention in the case of dual delegation, in which:
 a first delegation corresponds to the delegation between the server of the content provider and a primary delivery server known to the server of the content provider by way of a domain name, and
 a second delegation corresponds to the delegation between the primary delivery server and a secondary delivery server known to the primary delivery server by way of an authentic address, called authentic secondary delivery server.

In this context, the described technique makes provision for the address that the client terminal effectively receives to be validated in order to download the desired item of content from a secondary delivery server identified by the address received by the client terminal. Such a secondary delivery server is potentially a fraudulent server different from the authentic secondary delivery server to which the primary delivery server has effectively delegated the content delivery. The validation of the address by the client terminal is based on an item of information received by the client terminal from the server of the content provider.

The client terminal thus knows whether the secondary delivery server from which it received the address has effectively received a content delivery delegation from the primary delivery server, and therefore whether the received address is indeed that of the authentic secondary delivery server, or that of a fraudulent server.

Such a general principle applies both in the case in which the primary delivery server has not delegated the delivery of the item of content to a secondary delivery server (that is to say when the address received by the client terminal is that of the primary delivery server) and in the case of multiple delegations.

Figure 1:
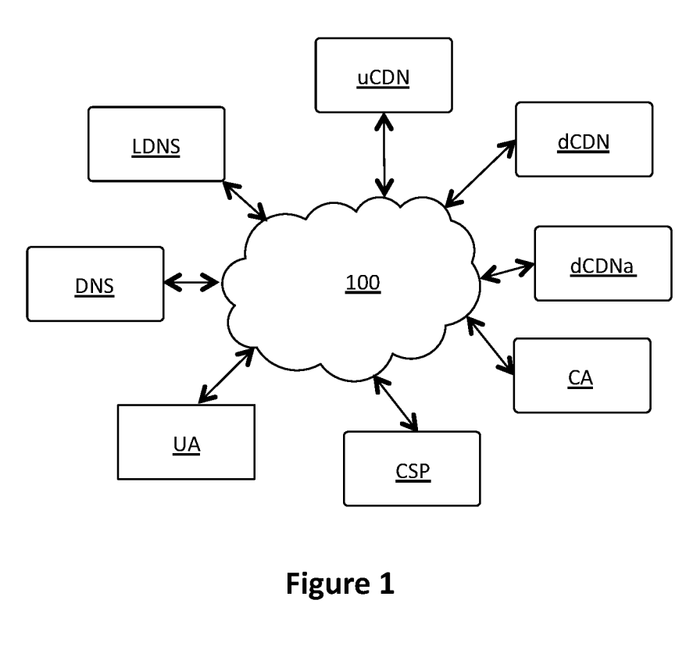
FIG. 1 illustrates a network configuration contextualizing the entities involved in the described technique.

A description is now given, with reference to FIG. 1, of a network configuration contextualizing the entities involved in the described technique. More particularly, the following entities are illustrated:
 a server CSP of a content provider referencing various items of content (for example multimedia content, or content comprising sounds, images or videos, or executable files) intended to be distributed to client terminals of end users;
 a client terminal UA, for example a computer, a smartphone of a user, wishing to obtain an item of content from the content provider, such a client terminal UA possibly incorporating one or more client agents (or "user agents") of http (for "HyperText Transfer Protocol") or HTTPS (for "HyperText Transfer Protocol Secure") type or else of Internet browser type;
 a primary content delivery server uCDN to which the server CSP of the content provider has delegated the delivery of the item of content in question and that is known to the server CSP of the content provider by way of a domain name;
 an authentic secondary delivery server dCDNa to which the primary content delivery server uCDN has effectively delegated the delivery of the item of content desired by the user of the client terminal UA in a dual delegation context. The authentic secondary delivery server dCDNa is moreover known to the primary content delivery server uCDN by what is known as an authentic network address (for example an IP address in accordance with the Internet protocol);
 a secondary delivery server dCDN, identified by a network address that is potentially different from the authentic address. In the latter case, the secondary delivery server dCDN is a delivery server possibly considered to be fraudulent, i.e. that may deliver an item of content different from the item of content effectively desired by the user of the client terminal UA;
 a local domain name resolution server LDNS for associating the domain name in question with the network address of the secondary delivery server dCDN;
 an authoritative domain name resolution server DNS with which the local domain name resolution server LDNS updates its data in cache so as to maintain the correspondence between domain names and corresponding delivery servers;
 a server CA of a certification authority for issuing certificates, for example in accordance with the HTTPS (for "HyperText Transfer Protocol Secure") protocol, to the secondary delivery servers dCDN, dCDNa in question.

The various entities presented above are then connected to one another via a telecommunications network 100 in order to transmit data, for example based on an Internet protocol.

In some embodiments, the local domain name resolution server LDNS and authoritative domain name resolution server DNS are grouped together within one and the same physical entity, and then correspond to just one and the same domain name resolution server.

In other embodiments, the primary delivery server uCDN and authentic secondary delivery server dCDNa are also grouped into one and the same hardware entity in a single delegation context.

In yet other embodiments, various delivery servers (secondary, tertiary, etc.) are present, for example in a multiple delegation context.

Figure 2A:
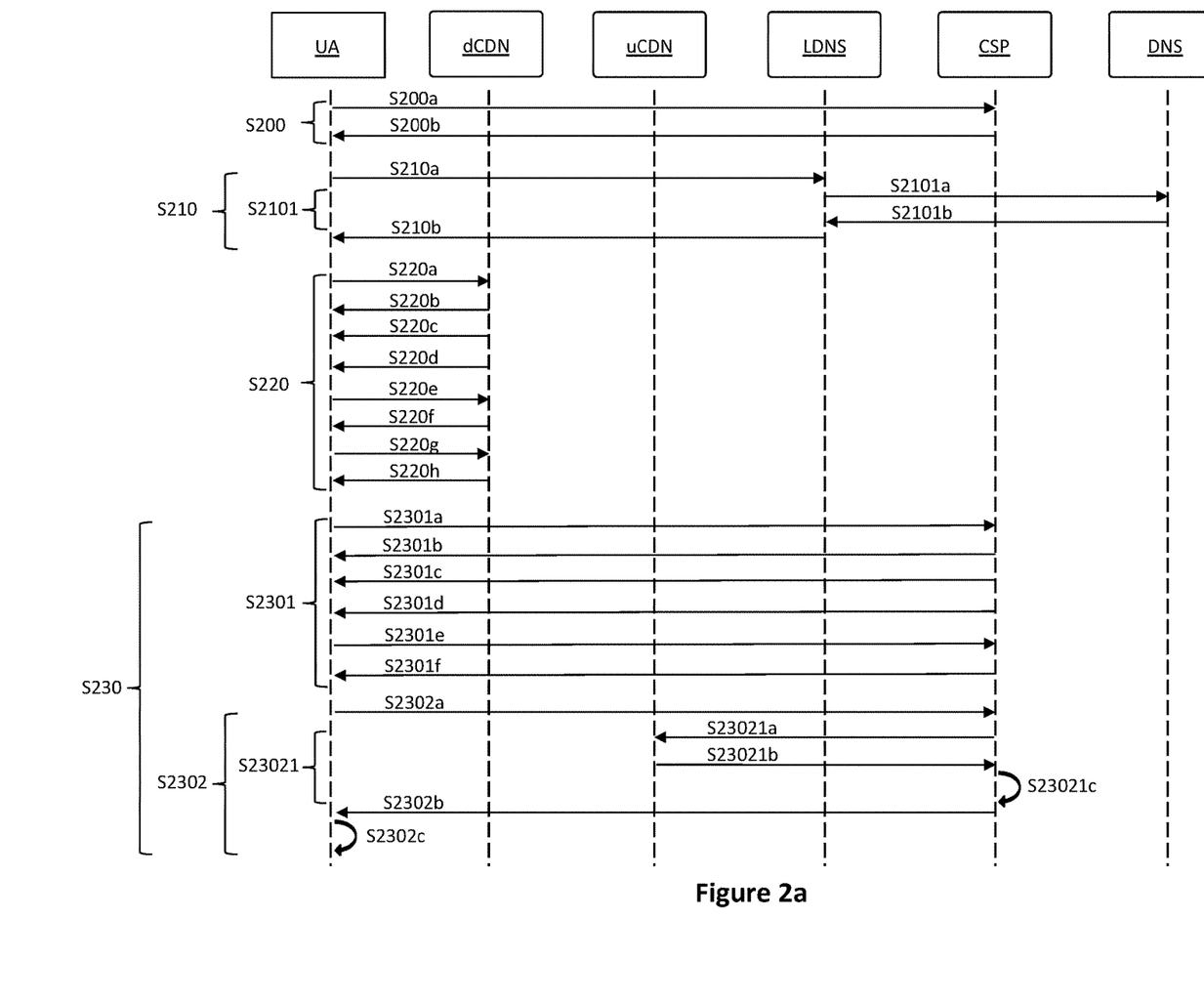
FIGS. 2a and 2b illustrate the steps of a method for validating delivery of an item of content and the steps of a method for verifying delegation of delivery of an item of content according to various embodiments of the invention.

A description is now given, with reference to FIG. 2a, of various embodiments of a method for validating delivery of an item of content, implemented by the client terminal UA, and of a method for verifying delegation of delivery of an item of content, implemented by the server CSP of the content provider.

In a step S200, the client terminal UA receives a domain name that identifies the primary content delivery server uCDN to which the server CSP of the content provider has delegated the delivery of the item of content desired by the client terminal UA.

To this end, the client terminal UA sends a request (S200a) to the server CSP of the content provider, for example in the form of a request "GET http://www.csp.com/ pathX/contentX" in the HTTP format.

The client terminal UA receives, in response, a message (S200b) from the server CSP of the content provider corresponding to a redirection to the primary content delivery server uCDN to which the server CSP of the content provider has delegated the delivery of the item of content desired by the client terminal UA. To this end, the response message contains the domain name that identifies the primary content delivery server uCDN. This response message may for example take the form of a response "3xx redirect https://www.ucdn.com/pathY/contentY" in the HTTPS format (for example a message of "308 redirect" type), the access path "Y" being known to the server CSP of the content provider, for example via a correspondence map between X and Y.

According to some embodiments, the response message (S200b) received by the client terminal UA may also comprise at least one additional item of data allowing the client terminal to implement some steps of the described technique that are detailed below with reference to step S230.

In a step S210, the client terminal UA receives an address, called received address, from the secondary delivery server dCDN, which will effectively perform the delivery of the item of content to the client terminal UA.

To this end, the client terminal UA sends a request (S210a) comprising the domain name received in step S200 to the local domain name resolution server LDNS. Such a request is for example of the form "DNS QUERY ucdn.com".

In return, the client terminal UA receives a response message (S210b) from the local domain name resolution server LDNS containing the address of the secondary delivery server dCDN.

In one embodiment, the local domain name resolution server LDNS itself obtains the address of the secondary delivery server dCDN from the authoritative domain name resolution server DNS in a sub-step S2101, for example by sending a request (S2101a) that may take the form "DNS QUERY ucdn.com" to the authoritative domain name resolution server DNS, and receiving, in return, a message (S2101b) containing the address of the secondary delivery server dCDN.

However, the connection to such an authoritative domain name resolution server DNS may be secure only to a small extent in practice. It is thus sometimes the case that the cache memory of the authoritative domain name resolution server DNS is modified fraudulently, or else quite simply that this memory has not been updated in spite of a modification of the delivery server to which the delivery of the item of content has been delegated. For example, such a malicious third party could have substituted a fraudulent IP address (for example "24.45.73.92") for the authentic address normally associated with the domain name "ucdn.com", i.e. the address of a fraudulent secondary delivery server dCDN has been substituted for the address of the authentic secondary delivery server dCDNa to which the primary delivery server uCDN has delegated the delivery. In this case, the local domain name resolution server LDNS, which updates its correspondence tables from the authoritative domain name resolution server DNS, also associates the fraudulent address with the domain name "ucdn.com" instead of the authentic address normally associated with this domain name "ucdn.com".

In this context, the client terminal UA receives, from the local domain name resolution server LDNS, a message (S210b) that contains the fraudulent address, for example a response message of the type "DNS IN A 24.45.73.92". The client terminal UA therefore receives the address of the potentially fraudulent secondary delivery server dCDN, instead of the authentic address of the authentic secondary delivery server dCDNa to which the primary delivery server uCDN has delegated the content delivery.

In the embodiment described above with reference to FIG. 1, in which the local domain name resolution server LDNS and authoritative domain name resolution server DNS are grouped together within one and the same physical entity and then correspond to just one and the same domain name resolution server, the same problem of modification, by a malicious third party, of the cache of the authoritative server DNS associating domain names and server addresses also arises when this malicious third party substitutes the address of a fraudulent secondary delivery server for the address of the authentic secondary delivery server dCDNa.

In a step S220, the client terminal UA initiates downloading of the item of content from the secondary delivery server dCDN from which it received the address in step S210 (i.e. a potentially fraudulent item of content when the received address corresponds to the address of a fraudulent secondary delivery server dCDN).

Such downloading is initiated for example via the exchange of the following TLS (for "Transport Layer Security") messages, making it possible to establish a secure link for the transmission of the item of content in accordance with the HTTPS protocol:

sending a request (S220a) to the secondary delivery server dCDN, for example in the form "ClientHello (SNI=www.ucdn.com)";

receiving a message (S220b) from the secondary delivery server dCDN of the type "ServerHello";

receiving a message (S220c) of "Certificate" type coming from the secondary delivery server dCDN. The field of the certificate "common name" contained in the fields "csp.com" or "ucdn.com" signed by the certification authority CA;

receiving a message (S220d) from the secondary delivery server dCDN of the type "ServerKeyExchange";

sending a message (S220e) to the secondary delivery server dCDN of the type "ClientKeyExchange", finalizing the exchange of encryption keys used to encrypt the TLS session established between the client terminal UA and the secondary delivery server;

receiving a message (S220f) from the secondary delivery server dCDN of the type "Finished", indicating that the secure link is established;

sending a request (S220g) to the secondary delivery server dCDN, of the type "GET https://www.ucdn.com/pathY/contentY", in accordance with the HTTP protocol so as to initiate downloading of the item of content;

receiving a message (S220h) from the secondary delivery server dCDN of the type "200 OK" in accordance with the HTTP protocol, followed by the item of content delivered by the secondary delivery server dCDN to the client terminal UA.

If the address received by the client terminal UA in step S210 is different from the authentic address, the item of content received by the client terminal UA in step S220 is potentially different from the item of content expected by the client terminal UA.

To secure the downloading of the item of content, the client terminal UA determines, in a step S230, the validity of the address received in step S210 with respect to the authentic address. More particularly, the determination of the validity is based on an item of information to the authentic address received from the server CSP of the content provider.

To this end, in one embodiment, a secure connection is first of all initiated in a sub-step S2301 between the client terminal UA and the server CSP of the content provider, for example via the exchange of the following TLS messages, making it possible to establish a secure link in order to receive the item of information to the authentic address from the server CSP of the content provider:

sending a request (S2301a) to the server CSP of the content provider of the type "ClientHello (SNI=www.csp.com)";

receiving a message (S2301b) from the server CSP of the content provider of the type "ServerHello";

receiving a message (S2301c) from the server CSP of the content provider of the type "Server Certificate";

receiving a message (S2301d) from the server CSP of the content provider of the type "ServerKeyExchange";

sending a message (S2301e) to the server CSP of the content provider of the type "ClientKeyExchange", finalizing the exchange of encryption keys;

receiving a message (S2301f) from the server CSP of the content provider of the type "Finished", indicating that the secure link is established.

Once the secure connection has been established, in a step S2302, the client terminal UA receives the item of information to the authentic address sent by the server CSP of the content provider.

To this end, in a sub-step S23021, the server CSP of the content provider obtains the item of information to the authentic address, allowing the client terminal UA to determine the validity of the received address with respect to the authentic address.

In a first embodiment of sub-step S2302, the client terminal UA sends a request (S2302a) to the server CSP of the content provider so as to receive, in return, a message (S2302b) comprising the item of information to the authentic address from the server CSP of the content provider.

The server CSP of the content provider then sends a request (S23021a) to the primary delivery server uCDN so as to receive a response (S23021b) comprising the authentic address of the authentic secondary delivery server dCDNa to which the primary delivery server uCDN has delegated the content delivery.

In a step S23021c, the server CSP of the content provider determines an item of information to the authentic address. In this first embodiment, the item of information to the authentic address corresponds to the authentic address itself.

The client terminal UA receives a message (S2302b) comprising the item of information to the authentic address. In a step S2302c, the client terminal UA thus compares the received address and the authentic address so as to determine the validity of the received address, i.e. whether the secondary delivery server dCDN indeed corresponds to the authentic secondary delivery server dCDNa to which the primary delivery server uCDN has delegated the content delivery.

In a second embodiment of sub-step S2302, the request (S2302a) sent by the client terminal UA to the server CSP of the content provider comprises the received address identifying the secondary delivery server dCDN. This may be for example an HTTP request of XHR type (for "XML HTTP request") to "https://www.csp.com", with "@IP dCDN 24.45.73.92, [record DNS, @DNS]" as parameters.

The server CSP of the content provider then obtains the authentic address either in the form of a predetermined address that it has stored, or directly from the primary delivery server uCDN.

In the latter case, the server CSP of the content provider sends a request (S23021a) to the primary delivery server uCDN so as to receive a response (S23021b) comprising the authentic address of the authentic secondary delivery server dCDNa to which the primary delivery server uCDN has delegated the content delivery.

In a step S23021c, the server CSP of the content provider determines the item of information to the authentic address by comparing the received address and the authentic address.

The client terminal UA receives a message (S2302b) comprising the item of information to the authentic address determined by the server CSP of the content provider in step S23021c. In this second embodiment, such an item of information corresponds to at least one data field positioned at a value indicating whether the received address is equal to the authentic address.

Thus, the verification of the match between the received address and the authentic address is performed by the server CSP of the content provider, thereby simplifying the processing operations performed by the client terminal.

In a third embodiment of sub-step S2302, the request (S2302a) sent by the client terminal UA to the server CSP of the content provider comprises the received address identifying the secondary delivery server dCDN. This may be for example a request of the type "GET xhr request https://www.csp.com/, @IP dCDN 24.45.73.92, [record DNS, @DNS]".

The server CSP of the content provider then sends a request (S23021a) to the primary delivery server uCDN comprising the received address identifying the secondary delivery server dCDN so as to receive, in return, a response (S23021b) comprising a result of a comparison with the authentic address of the authentic secondary delivery server dCDNa to which the primary delivery server uCDN has delegated the content delivery. In this third embodiment, such a comparison is performed by the primary delivery server uCDN.

In step S23021c, the server CSP of the content provider determines the item of information to the authentic address on the basis of the result of the comparison performed by the primary delivery server uCDN.

The client terminal UA receives a message (S2302b) comprising the item of information to the authentic address corresponding, in this third embodiment, to at least one data field positioned at a value indicating whether the received address is equal to the authentic address.

Thus, according to various variants, the authentic address belongs to the group comprising at least:
  a predetermined address stored on the primary delivery server uCDN;
  a predetermined address stored on the server CSP of the content provider;
  an address obtained by the server CSP of the content provider from the primary delivery server uCDN for the item of content desired by the client terminal;
  an address obtained beforehand by the server CSP of the content provider from the primary delivery server uCDN for the item of content desired by the client terminal and updated periodically from the primary delivery server uCDN.

The authentic address may thus be predetermined, thus allowing optimum security and minimization of the exchanges between entities. As an alternative, the authentic address may be obtained from the primary delivery server uCDN so as to allow the described technique to be implemented when the authentic address is regularly updated.

Moreover, according to various embodiments, the execution of step S230 is implemented on the basis of various software means and/or various conditional implementation criteria.

For example, in one embodiment, the client terminal UA comprises, by default, the code instructions for implementing step S230 of determining the validity of said received address with respect to said authentic address in accordance with the described technique. For example, such code instructions are contained in the code instructions for executing an Internet browser used to obtain the item of content on the client terminal UA. In this case, the exchanges between entities that are involved are minimized, the server CSP of the content provider not having to transmit additional code instructions to the client terminal UA.

In another embodiment, the response message (S200b) received by the client terminal UA in step S200 described above furthermore comprises at least one additional item of data comprising at least code instructions allowing the client terminal to implement step S230. Client terminals equipped with an Internet browser from the prior art may thus implement the described technique, the additional means necessary for this implementation being provided to such browsers by the server CSP of the content provider.

In one variant, the at least one item of data contained in the response message (S200b) received by the client terminal UA in step S200 comprises at least one data field positioned at a value telling the client terminal UA to perform step S230 of determining the validity of the received address with respect to the authentic address. The content provider thus keeps control over the implementation of the validation of the delivery delegation by the client terminal.

In another embodiment, the downloading of the item of content delivered by the secondary delivery server dCDN identified by the received address is performed via a secure connection based on a certificate of the domain name, as described above with reference to step S220. In this case, step S230 of determining the validity of the received address with respect to the authentic address is implemented when the certificate is not issued by the certification authority, but when the certificate is self-signed by the secondary delivery server dCDN identified by the received address. Thus, the verification by the client terminal is performed when there is suspicion as to the nature of the secondary delivery server dCDN.

In the variant illustrated in FIG. 2a, the downloading of the item of content has been initiated in step S220 before implementing step S230 of determining the validity of the received address with respect to the authentic address. In step S230, if the client terminal determines that the received address is not valid (i.e. that the received address is different from the authentic address), the downloading of the item of content is interrupted by the client terminal UA.

Figure 2B:
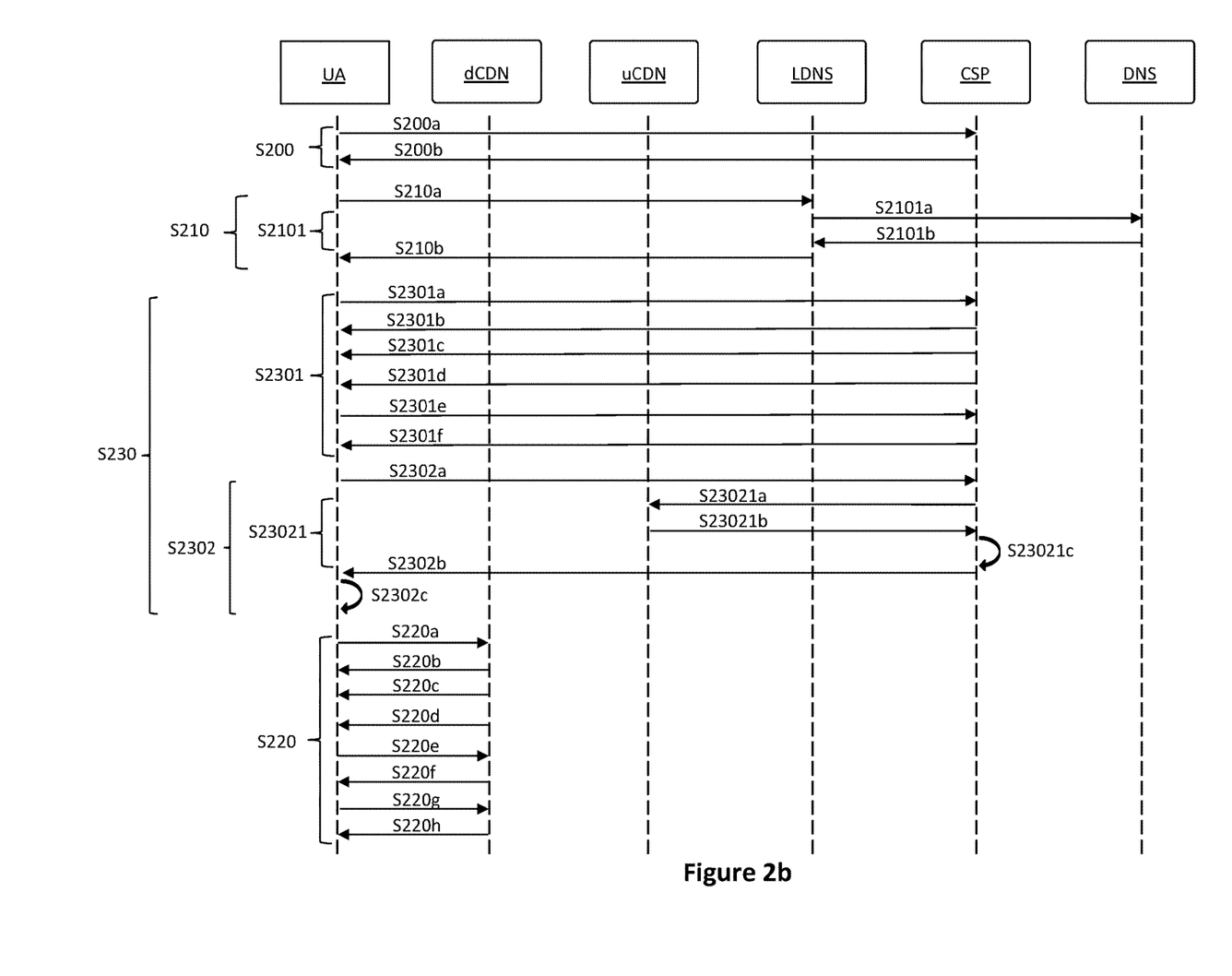

FIG. 2b illustrates a variant in which step S230 of determining the validity of the received address with respect to the authentic address is implemented before step S220 of downloading the item of content. According to this variant, if, in step S230, the client terminal UA determines that the received address is valid (i.e. that the received address is equal to the authentic address), the downloading of the item of content is initiated in step S220.

In other embodiments, step S23021 of obtaining the item of information (item of information allowing the client terminal UA to determine the validity of the received address with respect to the authentic address in step S230) is implemented by a server of the content provider other than the server CSP of the content provider that provided the response message (S200b) received by the client terminal UA in step S200 described above.

Figure 3:
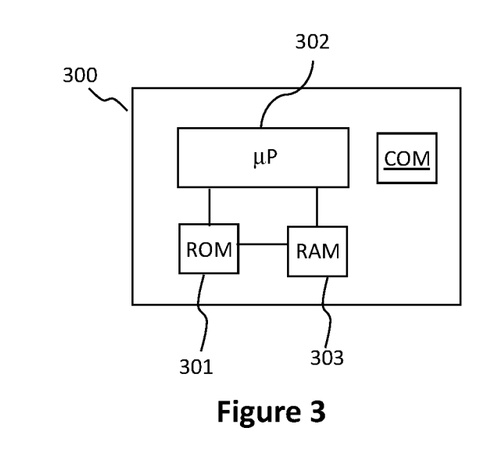
FIG. 3 shows an example of a structure of a device for validating delivery of an item of content for implementing the method for validating delivery of an item of content of FIGS. 2a and 2b.

In this case, the response message (S200b) received by the client terminal UA in step S200 furthermore comprises an additional item of data (for example a token) telling the client terminal UA that server of the content provider to which it should send the requests when implementing step S230. FIG. 3 shows an example of a structure of a device for validating delivery of an item of content 300, for implementing a method for validating delegation of delivery of an item of content according to any one of the embodiments described above with reference to FIGS. 2a and 2b.

The validation device 300 comprises a random access memory 303 (for example a RAM memory), a processing unit 302, equipped for example with a processor, and driven by a computer program stored in a read-only memory 301 (for example a ROM memory or a hard disk). On initialization, the code instructions of the computer program are for example loaded into the random access memory 303, before being executed by the processor of the processing unit 302.

FIG. 3 illustrates just one particular embodiment, out of several possible particular embodiments, of the method for validating delivery of an item of content detailed above with reference to FIGS. 2a and 2b. Specifically, the technique of the invention is carried out indiscriminately on a reprogrammable computing machine (a PC, a DSP processor or a microcontroller) executing a program comprising a sequence of instructions, or on a dedicated computing machine (for example a set of logic gates such as an FPGA or an ASIC, or any other hardware module).

If the invention is installed on a reprogrammable computing machine, the corresponding program (that is to say the sequence of instructions) may be stored in a removable storage medium (such as for example a floppy disk, a CD-ROM or a DVD-ROM) or a non-removable storage medium, this storage medium being able to be read partly or fully by a computer or a processor.

The validation device also comprises a communication module (COM) configured to receive an address, called received address, in response to a request sent to a domain name resolution server. The communication module is also configured to receive an item of information to an authentic address associated with the delivery server for delivering the item of content requested by the client terminal.

According to one particular embodiment of the invention, the processing unit comprises an Internet browser software module or HTTP client configured to implement the validation method according to any one of the particular embodiments described above.

According to one embodiment, such a validation device is contained within a client terminal.

Figure 4:
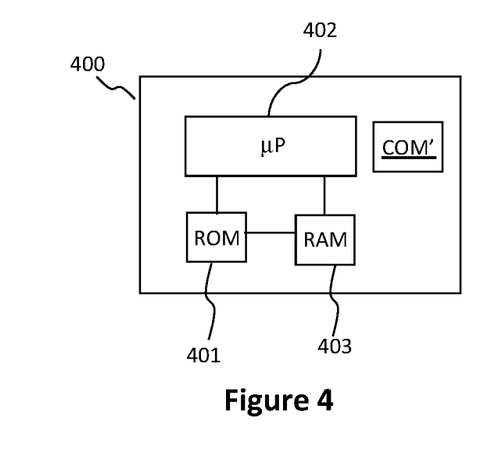
FIG. 4 shows an example of a structure of a device for verifying delegation of delivery of an item of content for implementing the method for verifying delegation of delivery of an item of content of FIGS. 2a and 2b.

FIG. 4 shows an example of a structure of a device 400 for verifying delegation of delivery of an item of content, for implementing a method for verifying delegation of delivery of an item of content according to any one of the embodiments described above with reference to FIGS. 2a and 2b.

The verification device 400 comprises a random-access memory 403 (for example a RAM memory), a processing unit 402, equipped for example with a processor, and driven by a computer program stored in a read-only memory 401

(for example a ROM memory or a hard disk). On initialization, the code instructions of the computer program are for example loaded into the random-access memory 403, before being executed by the processor of the processing unit 402.

FIG. 4 illustrates just one particular way, out of several possible ones, of implementing the method for verifying delegation of delivery of an item of content detailed above with reference to FIGS. 2a and 2b. Specifically, the technique of the invention is carried out indiscriminately on a reprogrammable computing machine (a PC, a DSP processor or a microcontroller) executing a program comprising a sequence of instructions, or on a dedicated computing machine (for example a set of logic gates such as an FPGA or an ASIC, or any other hardware module).

If the invention is installed on a reprogrammable computing machine, the corresponding program (that is to say the sequence of instructions) may be stored in a removable storage medium (such as for example a floppy disk, a CD-ROM or a DVD-ROM) or a non-removable storage medium, this storage medium being able to be read partly or fully by a computer or a processor.

The verification device also comprises a communication module (COM') configured to send an item of information to the client terminal, the item of information allowing the client terminal to determine the validity of an address, called received address (and received by the client terminal in response to a request sent to a domain name resolution server), with respect to an authentic address associated with a delivery server.

In one embodiment, such a verification device is contained within a server, for example a server of a content provider.

The invention claimed is:

1. A method for validating delivery of an item of content to a user terminal, comprising the following acts performed by the user terminal:
receiving an address, called received address, in response to a request sent to an address server in order to obtain the address of a delivery server for delivering said item of content, the request comprising an item of information identifying said delivery server;
receiving an item of information allowing a determination of validity of the received address with respect to an authentic address associated with said delivery server, called item of information of validation, said item of information of validation being sent by a server of the content provider and; and
determining validity of said received address with respect to said authentic address on the basis of said item of information of validation.

2. The method as claimed in claim 1, wherein said item of information of validation comprises said authentic address, and wherein said determining validity of said received address with respect to said authentic address furthermore comprises:
comparing said received address and said authentic address.

3. The method as claimed in claim 1, wherein said determining validity of said received address with respect to said authentic address furthermore comprises, prior to said receiving said item of information of validation:
sending a request to said server of the content provider, comprising said received address identifying said delivery server so as to receive said item of information of validation;
said item of information of validation corresponding to at least one data field positioned at a value indicating whether said received address is equal to said authentic address.

4. The method as claimed in claim 1, furthermore comprising receiving a message comprising at least one item of data for implementing said determining the validity of said received address with respect to said authentic address, in response to a request from the user terminal to another server of the content provider in order to obtain the item of content.

5. The method as claimed in claim 4, wherein said at least one item of data comprises at least code instructions for implementing said determining the validity of said received address with respect to said authentic address.

6. The method as claimed in claim 4, wherein said at least one item of data comprises at least one other data field positioned at a value telling said user terminal to perform said determining the validity of said received address with respect to said authentic address.

7. The method as claimed in claim 1, furthermore comprising:
downloading said item of content delivered by a delivery server identified by the received address, said delivery being performed via a secure TLS connection based on a certificate of said domain name;
said determining the validity of said received address with respect to said authentic address being implemented when said certificate is self-signed by said delivery server identified by the received address.

8. The method as claimed in claim 1, wherein said delivery is delegated by said delivery server to at least one secondary delivery server, the authentic address identifying said secondary delivery server being stored in said delivery server.

9. The method as claimed in claim 8, wherein said authentic address belongs to the group consisting of:
a predetermined address stored on said delivery server;
a predetermined address stored on said server of the content provider;
an address obtained by said server of the content provider from said delivery server for said item of content; and
an address obtained beforehand by said server of the content provider from said delivery server for said item of content and updated periodically from said delivery server.

10. A method for verifying delegation of delivery of an item of content to a user terminal, wherein the method comprises the following acts implemented by a server of a content provider of the content:
obtaining an item of information, called item of information of validation, allowing the user terminal to determine validity of an address with respect to an authentic address associated with a delivery server,
said address, called received address, being received by the user terminal in response to a request sent by the user terminal to an address server in order to obtain an address of the delivery server, the request comprising an item of information to identifying said delivery server; and
sending said item of information allowing the user terminal to determine validity of said received address with respect to the authentic address to said user terminal.

11. The method as claimed in claim 10, wherein said item of information of validation sent to the user terminal corresponds to said authentic address.

12. The method as claimed in claim 10, furthermore comprising:
- receiving at least one request sent by said user terminal, said at least one request comprising said received address; and
- comparing said received address and said authentic address in order to deliver said item of information of validation sent to the user terminal,
- said item of information of validation sent to the user terminal corresponding to at least one data field positioned at a value indicating whether said received address is equal to said authentic address.

13. The method as claimed in claim 10, wherein said delivery is delegated by said delivery server to at least one secondary delivery server, the authentic address identifying said secondary delivery server being stored in said delivery server.

14. A non-transitory computer-readable medium comprising a computer program product stored thereon, comprising program code instructions for implementing a method for validating delivery of an item of content to a user terminal, when said program is executed on a processing unit of the user terminal, the instructions configuring the user terminal to perform acts comprising:
- receiving an address, called received address, in response to a request sent to an address server in order to obtain the address of a delivery server for delivering said item of content, the request comprising an item of information identifying said delivery server;
- receiving an item of information called item of information of validation, allowing a determination of validity of the received address with respect to an authentic address associated with said delivery server, the item of information of validation being sent by a server of the content provider; and
- determining validity of said received address with respect to said authentic address on the basis of said item of information of validation.

15. A device for validating delivery of an item of content to a user terminal, the device comprising:
- a reprogrammable computing machine or a dedicated computing machine, both machines comprising hardware and able and configured so as to:
- receive an address, called received address, in response to a request sent to an address server in order to obtain an address of a delivery server for delivering said item of content, the request comprising an item of information identifying said delivery server;
- receive an item of information called item of information of validation, allowing a determination of validity of the received address with respect to an authentic address associated with said delivery server, the item of information of validation being sent by a server of a provider of the content; and
- determine validity of said received address with respect to said authentic address on the basis of said item of information of validation.

16. A device for verifying delegation of delivery of an item of content to a user terminal, wherein the device comprises:
- a reprogrammable computing machine or a dedicated computing machine, both machines comprising hardware and able and configured so as to:
- obtain an item of information, called item of information of validation, allowing the user terminal to determine validity of an address with respect to an authentic address associated with a delivery server,
- said address, called received address, being received by the user terminal in response to a request sent by the user terminal to an address server in order to obtain an address of the delivery server, the request comprising an item of information identifying said delivery server; and
- send said item of information of validation to said user terminal.

17. A non-transitory computer-readable medium comprising a computer program product stored thereon, comprising program code instructions for implementing a method for validating delivery of an item of content to a user terminal, when said program is executed on a processing unit of a server of a content provider of the content, the instructions configuring the server to perform acts comprising:
- obtaining an item of information, called item of information of validation, allowing the user terminal to determine validity of an address with respect to an authentic address associated with a delivery server,
- said address, called received address, being received by the user terminal in response to a request sent by the user terminal to an address server in order to obtain an address of the delivery server, the request comprising an item of information identifying said delivery server; and
- sending said item of information of validation to said user terminal.

\* \* \* \* \*